United States Patent [19]
Featherstone et al.

[11] Patent Number: 5,718,087
[45] Date of Patent: Feb. 17, 1998

[54] TELESCOPING MAST ASSEMBLY

[75] Inventors: Harry E. Featherstone, Wooster, Ohio; John W. Finnell, Costa Mesa, Calif.

[73] Assignee: The Will-Burt Company, Orrville, Ohio

[21] Appl. No.: 641,639

[22] Filed: May 2, 1996

[51] Int. Cl.$^6$ ..................................................... E04H 12/34
[52] U.S. Cl. ............................... 52/121; 52/108; 52/111; 52/118
[58] Field of Search ........................... 52/108, 111, 118, 52/121; 74/89.2

[56] References Cited

U.S. PATENT DOCUMENTS

| | | |
|---|---|---|
| 2,375,461 | 5/1945 | Bender . |
| 2,800,206 | 7/1957 | Thorpe . |
| 3,012,635 | 12/1961 | Blain . |
| 3,213,573 | 10/1965 | Bohr et al. ............... 52/111 X |
| 3,360,894 | 1/1968 | Sharman et al. ............... 52/108 |
| 3,434,254 | 3/1969 | Rubin . |
| 3,434,674 | 3/1969 | Groskopfs ............... 52/108 X |
| 3,499,610 | 3/1970 | Leonard . |
| 3,645,146 | 2/1972 | Nagin . |
| 3,691,705 | 9/1972 | Luckey . |
| 3,696,568 | 10/1972 | Berry ............... 52/108 |
| 3,800,965 | 4/1974 | Barron et al. . |
| 3,842,985 | 10/1974 | Svede . |
| 3,845,596 | 11/1974 | Veenstra . |
| 3,862,528 | 1/1975 | Meissinger ............... 52/108 |
| 3,863,405 | 2/1975 | Leiter . |
| 4,004,695 | 1/1977 | Hockensmith et al. . |
| 4,132,040 | 1/1979 | Grove . |
| 4,132,041 | 1/1979 | Van den Broek . |
| 4,133,411 | 1/1979 | Curb . |
| 4,169,338 | 10/1979 | Eik . |
| 4,327,533 | 5/1982 | Sterner . |
| 4,575,976 | 3/1986 | McDermott et al. . |
| 4,657,112 | 4/1987 | Ream . |
| 4,789,120 | 12/1988 | Spidel . |
| 5,056,278 | 10/1991 | Atsukawa . |
| 5,060,427 | 10/1991 | Bernabe, Jr. . |
| 5,102,375 | 4/1992 | Featherstone . |
| 5,107,672 | 4/1992 | Featherstone . |
| 5,139,464 | 8/1992 | Lehnert . |
| 5,168,679 | 12/1992 | Featherstone . |
| 5,189,773 | 3/1993 | Harvey et al. . |
| 5,203,746 | 4/1993 | Lehnert . |
| 5,249,643 | 10/1993 | Backer et al. . |

FOREIGN PATENT DOCUMENTS

| | | |
|---|---|---|
| 2336581 | 12/1975 | France . |
| 2301452 | 7/1974 | Germany . |
| 3408163 | 9/1985 | Germany . |
| 56-156540 | 12/1981 | Japan . |
| 276064 | 3/1949 | Sweden . |
| 1154858 | 6/1969 | United Kingdom . |
| 2075567 | 11/1981 | United Kingdom . |
| 2238333 | 5/1991 | United Kingdom . |
| 2257416 | 1/1993 | United Kingdom . |

*Primary Examiner*—Christopher Kent
*Attorney, Agent, or Firm*—Vickers, Daniels & Young

[57] ABSTRACT

A telescoping mast assembly having a plurality of interconnected mast sections nested within each other is provided. Mast sections move along an axis between retracted and extended positions. A single drive member having a circular shape within the mast sections and connected to one of the mast sections for displacing the sections in opposite directions along the axis is also provided. A contour forming mold for shaping the drive member is provided between the storage reel and the mast sections.

40 Claims, 11 Drawing Sheets

TELESCOPING MAST ASSEMBLY

The present invention relates to the art of telescoping masts and more particularly to telescoping masts having a drive assembly facilitating extension and retraction of the mast sections.

BACKGROUND OF THE INVENTION

The present invention is particularly applicable for use with mobile vehicles on land and sea. Such telescoping masts provide an elevated lighting system, or radio or television relay antenna. Additionally, such mast systems can be used to illuminate areas under bridges or over sharp drop offs, such as cliffs and mountain roads.

Generally, such telescoping masts may be adapted to fit on the roof of a vehicle, such as an emergency or military type vehicle. The mast is then usually outfitted with a fixture mounted at the top thereof, such as the above mentioned light or antenna fixed at the top of the mast.

A telescoping mast, to be placed on the roof of a vehicle, must be of relatively light weight, be durable, be compact in size, be capable of withstanding all kinds of weather and relatively maintenance free. A pneumatically telescoping mast is a common mast used for such applications. However, such pneumatic masts are subject to damage during operation. Such damage can affect the operability of the mast. In this respect, the mast must remain air tight for proper operation. A hole or fracture formed in the section of the mast may allow the escape of air and thus prevent proper inflation. Pneumatic masts are not generally adaptable to be partially extended in those instances where a certain desired elevation of a light fixture or another top-mounted fixture is desired.

Pneumatic masts are generally only extendable in a vertical or horizontal direction. This prevents use of such masts under bridges or over cliff sides where it would be desirable to extend the mast at an angle to project the light away from its mounting. One attempt to overcome the disadvantage of pneumatic masts is disclosed in Featherstone U.S. Pat. No. 5,572,237 which is commonly owned by the Assignee of the present invention and the disclosure of which is hereby incorporated by reference. While overcoming the bi-directional problem, the invention disclosed in Ser. No. 286,269 does not overcome the other disadvantages of pneumatic masts described hereinabove.

Alternative to pneumatically actuated telescoping masts are disclosed, for example in the U.S. Pat. Nos. 5,102,375, 5,107,672, 5,168,679 to Featherstone and U.S. Pat. Nos. 5,139,464 and 5,203,746 to Lehnert. Such tubular type of mast assemblies comprise a plurality of telescoping mast sections and a rigid drive assembly operable to displace the mast sections to any position between a fully retractive position and a fully extended position.

In the latter patents, the drive assembly comprises a plurality of inter-engaging chain members. Chain driven masts typically require a large number of moving parts including a plurality of sprocket and chain arrangements, a drive mechanism or mechanisms and special structural arrangements to interlock the chain members. In order to obtain positive extension and retraction, such a rigid drive mechanism is used to raise and lower the mast sections. Typically, as shown in the foregoing art, it is necessary to provide at least two sprockets or reels to store the chain while the mast is in the retracted position and pay out the chain to extend the mast. A significant amount of space is therefore required to store such chain due to the cross-sectional size of each chain link and the plurality of reels required. Additionally, a separate drive unit is often required for each of the reels. Accordingly, masts using such drive arrangements are undesirably expensive to manufacture and to maintain. Moreover, such mast arrangements are heavy and cumbersome and are not readily capable of being mounted on the rooftop of vehicles without adding special structural support to the rooftop of the vehicle.

In an effort at further improving non-pneumatic telescoping masts, co-pending application Ser. No. 391,118 filed, Feb. 21, 1995, discloses a tubular drive member, which is constructed in such a way as to form a generally ellipsoidal cross sectional shape having an inherent spring bias. The tubular drive member is adapted to collapse against the inherent spring bias to assume a flat cross-sectional shape on a storage drum. While such drive member performs excellent for its intended purpose, the process of manufacturing the drive assembly is necessarily complicated and time consuming. It involves folding and bending a flat sheet of stainless steel foil, spot welding folded sheets together and, to impart an inherent spring bias, heating treating the steel for a substantial period of time. This step in the manufacturing process adds to the overall cost of a telescoping mast using such a drive assembly.

A further type of extension and retraction mechanism is disclosed U.S. Pat. No. 5,056,278 to Atsukawa. Atsukawa discloses band like plates having an arcuate cross-sectional shape which pass through corresponding contoured guide slits and support elements in the mast sections to extend and retract telescoping mast sections. Atsukawa '278 requires the use of at least two arcuate bands driven and retracted from separate reels. Upon unwinding from the reels, the bands naturally assume an arcuate cross-sectional shape, presumably from a previous heat treatment process. Additionally, Atsukawa requires the use of guide slits within each of the telescoping sections to maintain rigidity. Thus, it is recognized that the arcuate bands are not effective against vertical and lateral loads except when the unsupported length of the bands is relatively small. By requiring at least two storage reels, one for storage for each of the bands, Atsukawa also requires additional space for a mounting assembly. Moreover, Atsukawa requires the plural drive reel arrangements and a corresponding drive motor for operation of each drive wheel. All of these requirements results in the mast being uneconomical to make and operate and, due to the number of parts, expensive to maintain.

SUMMARY OF THE INVENTION

An extendable and retractable mast is provided in accordance with the present invention which overcome the foregoing and other disadvantages of the prior art. A telescoping mast assembly and drive assembly according to the invention reduces the space requirements for a mast relative to that of prior art masts, reduces the overall weight for rigid telescoping masts, significantly reduces manufacturing time and costs and provides the ability to use such a mast on the rooftop of a vehicle without the prior art disadvantages of having to reinforce the vehicle roof. More particularly in this respect, a telescoping mast according to the invention is capable of positive extension and retraction of the mast sections by means of a single drive member having a cross-sectional loop shape, preferably a closed or partly open curve, within the mast sections. The single drive member uses a single storage drum for storing the drive member when the mast is in a retracted position, a single drive motor for the reel or drum and a contour forming apparatus for shaping the drive member between the reel and the mast sections. Preferably, the drive member is shaped through a contour forming mold to assume a circular cross-section within said mast section. Upon retraction of the mast, the drive member is withdrawn from the mast sections and through the contour forming mold to assume its inherent flat shape, whereupon it is compactly stored on the storage drum or reel.

The present invention advantageously provides an improved telescoping mast assembly in which the mast components can be extended at any desired angle between horizontal and vertical and thus place a light directly over any site when required. The improved drive arrangement provides a less complex and less expensive mechanical drive arrangement than heretofore available. In this respect, the drive member assumes a naturally occurring, and inherently assumes a relatively flat cross-sectional shape and is capable of being wound on the take up reel in the flat cross-sectional shape. In this flat state, the drive member has a flexibility and elasticity which enables the drive member to be wound a number of times about the take up reel. When unwound from the reel, the drive member is pushed through the contour forming mold. The mold rolls the flat drive member, preferably a single stainless steel foil ribbon, into a loop shape, which is initially semi-circular and preferably a circular cross-sectional shape.

In it preferred cross-sectional shape, the drive member is rigid in both its longitudinal and lateral directions. The rigidity allows positive extension and retraction of the sections of the telescoping mast. The rigidity also provides a skeletal structure within a hollow tubular telescoping mast to provide additional rigidity to such a mast in order that the mast may support a larger load at the mast tip. The mast according to the invention also enables reducing the number of component parts required and enables reducing the size of the drive assembly in contrast to link and chain or dual drive systems. A single reel, single drive member and single drive motor in accordance with the invention is all that is required to operate the mast assembly in the extending and retracting modes. Further, the mast according to the invention reduces manufacturing costs and thus the overall costs of the device by eliminating heat treating steps to form the foil drive member and the associated time to perform the heat treating steps.

It is thus an outstanding object of the invention to provide an improved drive assembly for actuating a telescoping mast.

It is yet another object of the invention to provide an improved drive assembly for telescoping masts which provides positive extension and retraction of the mast with the use of a single drive member.

It is still another object of the invention to provide an improved telescoping mast assembly which is light weight and compact in size.

It is another object of the invention to provide an improved telescoping mast assembly in which the drive member provides added rigidity for withstanding longitudinal and lateral loads to the mast assembly.

Still a further object of the invention is to provide an improved telescoping mast assembly which is less expensive and less time consuming to manufacture and is easier and less expensive to maintain than alternative telescoping mast drive assemblies.

Yet a further object of the invention is to provide an improved telescoping mast assembly which reduces the number of component parts required for operation.

Yet, still another object of the invention is to provide an improved drive member assembly for displacing a plurality of mast sections, which is elastically formed during extension to assume a loop cross-sectional shape for extension and retraction.

Yet another object of the invention is to provide an improved drive member assembly which naturally assumes a flat cross-sectional shape for compact storage.

Another object of the invention is to provide an improved telescoping mast assembly which provides a single drive member that does not require a heat treating step during manufacturing.

These and other objects of the invention will become apparent to those skilled in the art upon reading and understanding the following detailed description of the preferred embodiments.

BRIEF DESCRIPTION OF THE DRAWINGS

The invention may take physical form in certain parts and arrangement of parts, preferred embodiments of which will be described in detail herein and are illustrated in the accompanying drawings wherein.

PREFERRED EMBODIMENTS

Figure 1:
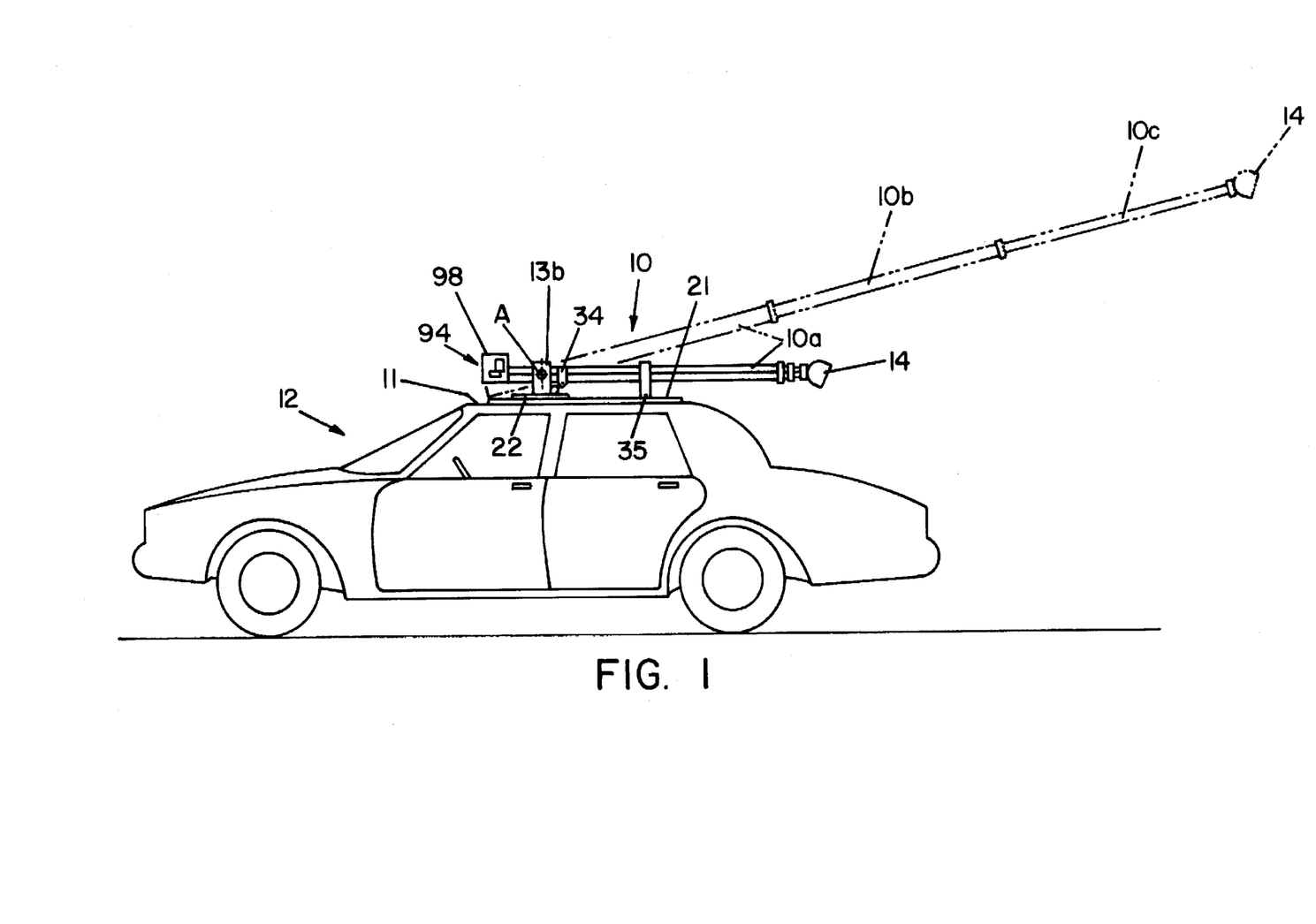
FIG. 1 is an elevation view illustrating use of a telescoping mast assembly of the present invention.

Referring to the drawings, wherein the showings are for the purpose of illustrating preferred embodiments of the invention only and not for the purpose of limiting same, FIG. 1 shows a telescoping mast assembly 10 mounted on the roof 11, of a motor vehicle 12. As shown, telescoping mast 10 is capable of being displaced from a retracted position (shown in solid lines) to an extended position (shown in broken lines). The mast is capable of pivoting about an axis A about the trunnion mounts 13a and 13b from a generally horizontal position to an upwardly inclined position. Telescoping mast assembly 10 is shown with a utility light 14 at the upper end thereof. Mast 10 thus has the capability of providing illumination to areas under bridges or over sharp dropoffs, such as cliffs and mountain roads. It can also be used to light the underside of an overpass or bridge. It will appreciated that mast 10 may be outfitted with any desired electrical fixture, or with a multiple light configuration, depending on customer requirements. Similarly, mast 10 may be mounted on any suitable support vehicle including, emergency or military vehicles as well as water craft for use in search and rescue operations.

Figure 2:
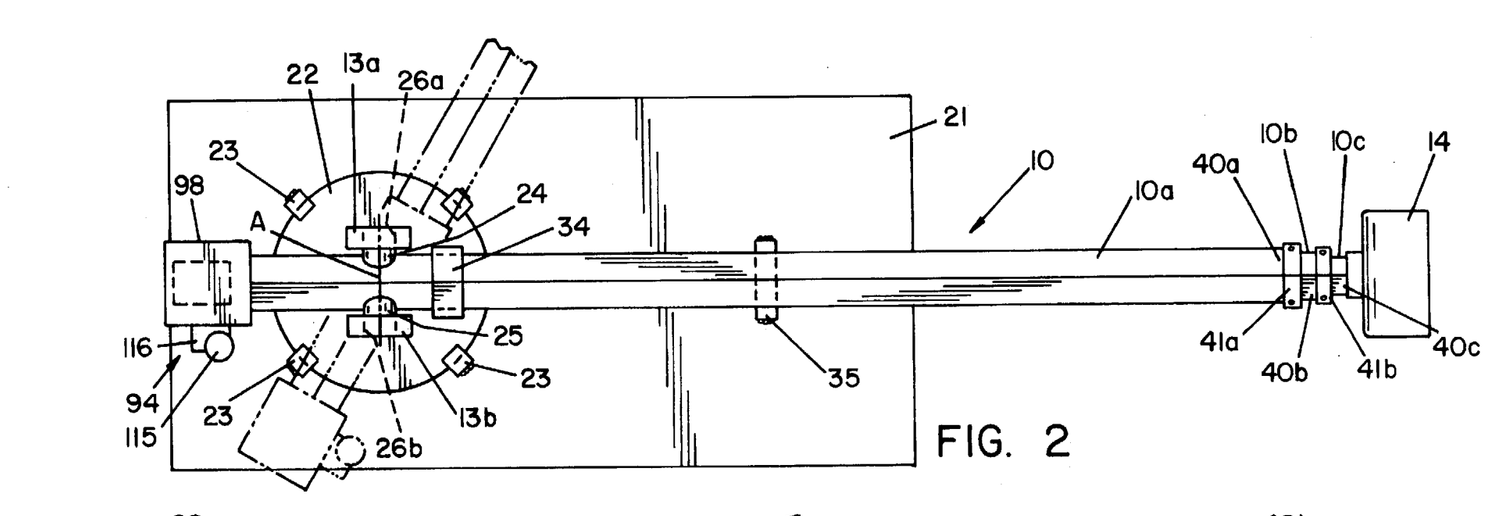
FIG. 2 is a plan view showing the telescoping mast assembly mounting arrangement.
Figure 3:
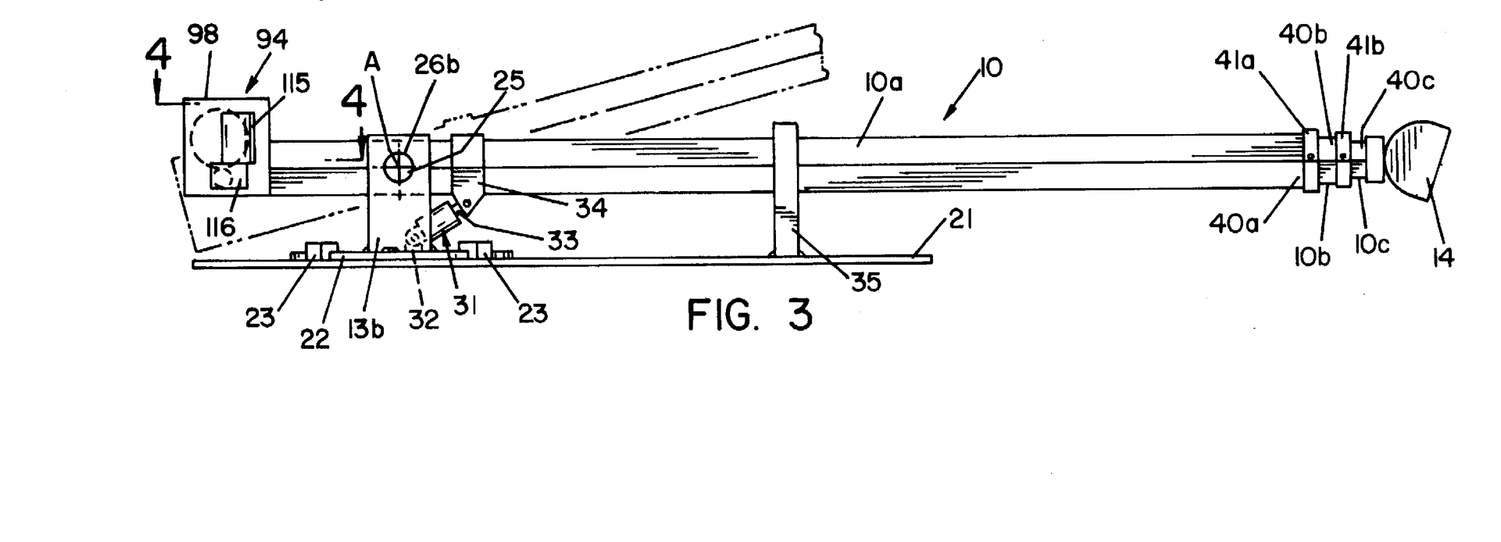
FIG. 3 is an elevation view of the telescoping mast shown in FIG. 2.

FIGS. 2 and 3 show mast assembly 10 mounted on a base plate 21 which can be permanently or removably attached to a transporting vehicle 12. Mounted on base plate 21 is a swivel plate 22 which is generally capable of rotating through 360° in order to place the mast in any rotational position desired. Swivel plate 22 is rotatably supported on base plate 21 by the L-shaped brackets 23 welded to base plate 21. In the preferred embodiment, swivel plate 22 is manually rotated. However, it will be appreciated that other means of rotating mast 10 can be used. Trunnion mounts 13a and 13b are mounted on swivel plate 22 with mast assembly 10 pivotally disposed therebetween. Mast assembly 10 is pivotally mounted on trunnion mounts 13a and 13b by means of the journals 24 and 25, respectively, which are welded to the exterior of the mast section 10a and rotatably received within the openings 26a and 26b in trunnion mounts 13a and 13b, respectively. Journals 24 and 25 provide pivot axis A. Although not shown, it is contemplated that the trunnion mounts, and the journals can provide for mast 10 to be elevated to a vertical position relative to base plate 21.

An air actuated piston cylinder unit 31 allows pivoting of mast 10 from the generally horizontal position. Piston cylinder unit 31 is pivotally mounted to swivel plate 22 by a support 32. The piston cylinder unit 31 includes a piston rod 33, pivotally attached to mast section 10a by a collar 34, whereby outward displacement of piston rod 33 from the piston cylinder unit 31 causes pivoting movement of mast 10 from the generally horizontal solid line position to the inclined position shown in phantom in FIG. 3. A hydraulic, electrical or other suitable drive may be used to cause the pivoting movement. In its horizontal position, mast 10 rests and is supported by a U-shaped storage support bracket 35 mounted on base plate 21.

Mast 10, in the preferred embodiment, is constructed of the three telescoping sections 10a, 10b and 10c of square aluminum tubing. It will be appreciated that the mast sections can be of material other than metal, or of a metal other than aluminum and that the cross-sectional configuration can be any one of a number of profiles such as rectangular, triangular, cylindrical, etc. Tubes 10a, 10b and 10c are axially, slidably interengaged for translation between retracted and extended positions relative to trunnion mounts 13a and 13b. Square mast assembly 10 is preferably mounted diagonally with respect to base plate 21 such that imaginary lines drawn between opposite corners of the tubing are parallel and perpendicular to base plate 21 when mast 10 is in its horizontal position. Tubes 10a, 10b and 10c include the corresponding outboard ends 40a, 40b and 40c, respectively. Tubes 10a and 10b also include outboard collars 41a and 41b, respectively, welded to the outboard ends 40a and 40b. Tubes 10a, 10b and 10c also include inboard ends 42a, 42b and 42c, respectively, and tubes 10b and 10c included inboard collars 43b and 43c, respectively, welded to the inboard ends thereof.

Figure 10:
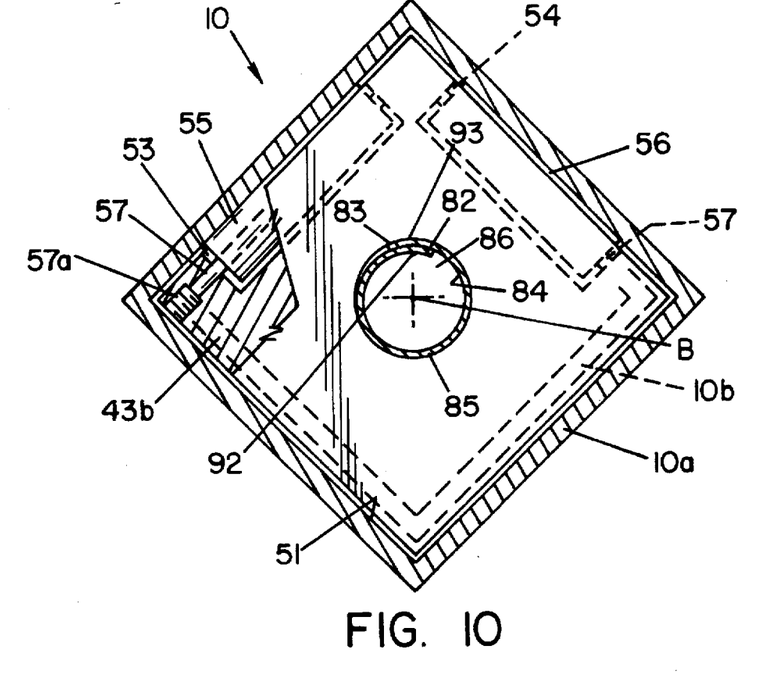
FIG. 10 is a cross-sectional view of the telescoping mast assembly taken along line 10—10 of FIG. 5.
Figure 11:
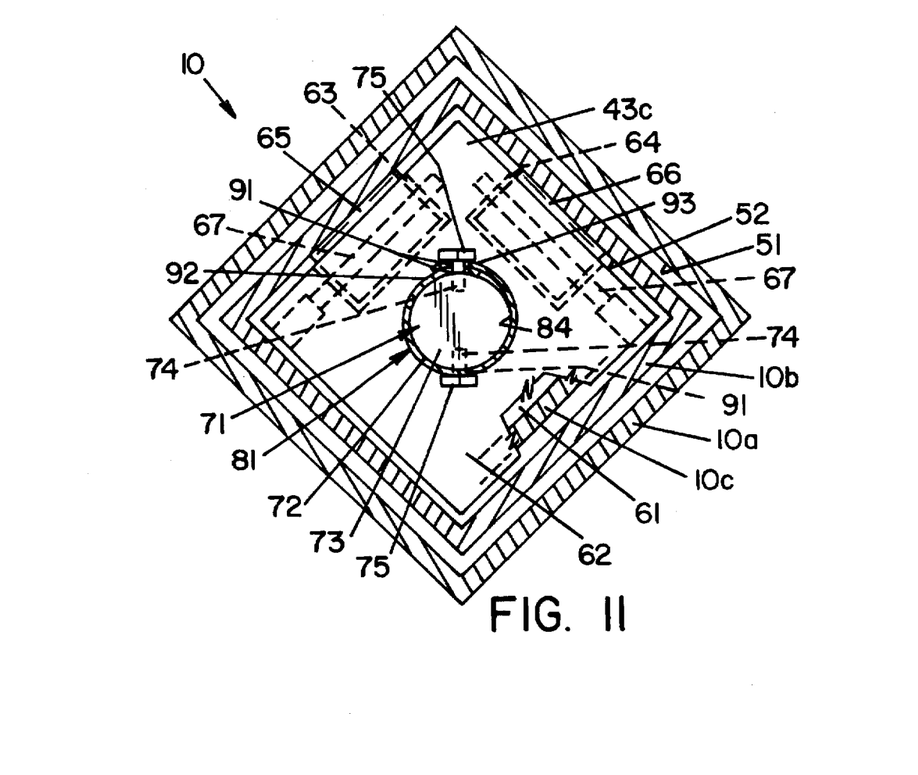
FIG. 11 is cross-sectional view of the telescoping mast assembly taken along line 11—11 of FIG. 5.

FIGS. 10 and 11 thus show the structure of inboard collars 43b, 43c which are virtually identical to each other except in size. Inboard collars 43b and 43c are respectively welded to the inboard ends 42b and 42c of tubes 10b and 10c. Inboard collars 43b and 43c have their inner ends located within tubes 10b and 10c, respectively, while the outer ends of the collars 43b and 43c extend radially outward such that the outer surface of inboard collar 43b is adjacent the inside surface 51 of tube 10a and the outer surface of inboard collar 43c is adjacent the inside surface 52 of tube 10b. As shown in FIG. 10, the two rectangular openings 53 and 54 are provided within inboard collar 43b. The roller bearings 55 and 56 are supported within the rectangular openings 53 and 54, respectively, and are mounted to rotate about a corresponding support shaft 57 such as a shoulder bolt having an outer threaded end 57a received in a threaded opening, therefor, in the collar. As mounted, roller bearings 55 and 56 contact inside surface 51 of tube 10a.

As best seen in FIG. 11, inboard collar 43c is a solid stub having an inner end 61 fitted onto end 42c of tube 10c and outer end 62. The pockets 63 and 64 are machined into outer end 62 adjacent inside surface 52 of tube 10b. The roller bearings 65 and 66 are respectively mounted in pockets 63 and 64 and supported for rotation by corresponding shaft 67 provided by shoulder bolts as described herein with respect to roller bearings 55 and 56. The outer surfaces of roller bearings 65 and 66 contact and are adapted to roll on inside surface 52 of tube 10b.

Mast assembly 10 can be extended and retracted in the horizontal direction and also when inclined relative to horizontal. The orientation of roller bearings 55, 56, 65 and 66 on inboard collars 43b and 43c help to support the load of the mast sections during extension and retraction and also restrain downward deflection when mast assembly 10 is in an extended position. Friction between the adjacent tubes during extension and retraction is also significantly reduced by the roller bearing arrangement. Thus, extension and retraction can be achieved with a minimal driving force. The diagonal orientation of the mast tubes also optimizes the rigidity thereof against vertical deflection when the mast is extended. It will be appreciated that additional roller bearings may be added or orientation of the existing roller bearings may be changed as the use or potential vertical elevation requirements of mast 10 change. While not shown, outboard collars 41a and 41b include roller bearings similar to roller bearings 55, 56, 65 and 66 except that the orientation is such that they coact with the outer surfaces of the next larger mast tube and would additionally be located opposite roller bearings 55, 56, 65 and 66 in order to provide additional support against downward vertical deflection when the mast is extended in a diagonal orientation between 0 and 90 degrees. Although not specifically shown, outboard collars 41a and 41b also coact with inboard collars 43b and 43c during extension of mast 10 to prevent separation of tubes 10b from tube or tube 10b 10c from tube 10a. As is well known in this respect, for example, each of the collars, 41a and 41b, include a shoulder portion extending radially into tubes 10a and 10b, respectively, to coact with shoulder portions on collars 43b and 43c, respectively, extending radially outward toward 10b and 10c. During extension, the abutment of corresponding shoulder portions prevents tubes 10b and 10c from separating from tube 10a or from one another.

Inboard collar 43c includes a cylindrical boss 71 extending axially outward from outer end 62 thereof. Boss 71 is cylindrical in shape and includes circumferential surface 72 and a circular end 73. Cylindrical boss 71 is centered on collar outer end 62. Boss 71 includes two diametrically opposite tapped holes 74 for receiving hex head bolts 75. Boss 71 provides the interconnection point between the tubes of mast 10 and the drive assembly for extending and retracting mast 10, which is described hereinafter.

As best seen in FIGS. 4–11, drive member 81 is provided for extending and retracting mast 10. Preferably drive member 81 is a stainless steel strip of foil which is 0.010 inches thick. No heat treating is necessary and the strip naturally and inherently assumes a flat, generally planar cross section when no forces are applied to it. Drive member 81 has a longitudinal extending axis B which is generally coaxial with telescoping mast assembly 10 for driving mast 10 between extended and retracted positions. Drive member 81 includes the two opposite longitudinally extending free edges 82 and 83 which are parallel to axis B, an inner extending surface 84 and an outer extending surface 85. As will be described hereinafter, and as seen in FIGS. 6–11, drive member 81 gradually is rolled against an inherent bias to assume a loop cross-sectional shape and preferably the circular cross-sectional shape, in order that drive member 81 forms a circular cross sectional shape within mast assembly 10. This circular cross section provides strength and rigidity to drive member 81 when subjected to either lateral and longitudinal forces. Such cross-sectional shape allows drive member 81 to push and pull tube 10c to expand and retract mast assembly 10. As described herein, the circular cross-sectional shape refers to that shape formed when drive member 81 is rolled over in order that opposite edges, as described hereinafter, generally abut or overlap.

As will be appreciated from FIG. 11, drive member 81 is permanently attached to mast 10, and specifically to tube 10c, using boss 71. In this respect, the end 81a of drive member 81 in its molded condition is place over boss 71, which has dimensions slightly less than or generally equal to the corresponding diameter dimension of the opening 86 formed by drive member 81. Thus, inner extending surface 84 facially contacts the circumferential surface 72 of boss 71. Drive member 81 is rigidly fastened to boss 71 and, for this purpose, three holes 91 are placed in drive member 81 adjacent end 81a. One hole 91 each is placed adjacent each free edge 82, 83 in a free edge portion 92 and 93 adjacent free edges 82 and 83, respectively. A third hole 91 is placed adjacent end 81a relatively equidistant between free edges 82 and 83. Holes 91 are aligned in substantial registry with tapped holes 74 in boss 71, and thus receive hex head bolts 75 in order that drive member 81 is rigidly fastened to boss 71 and tube 10c.

Figure 4:
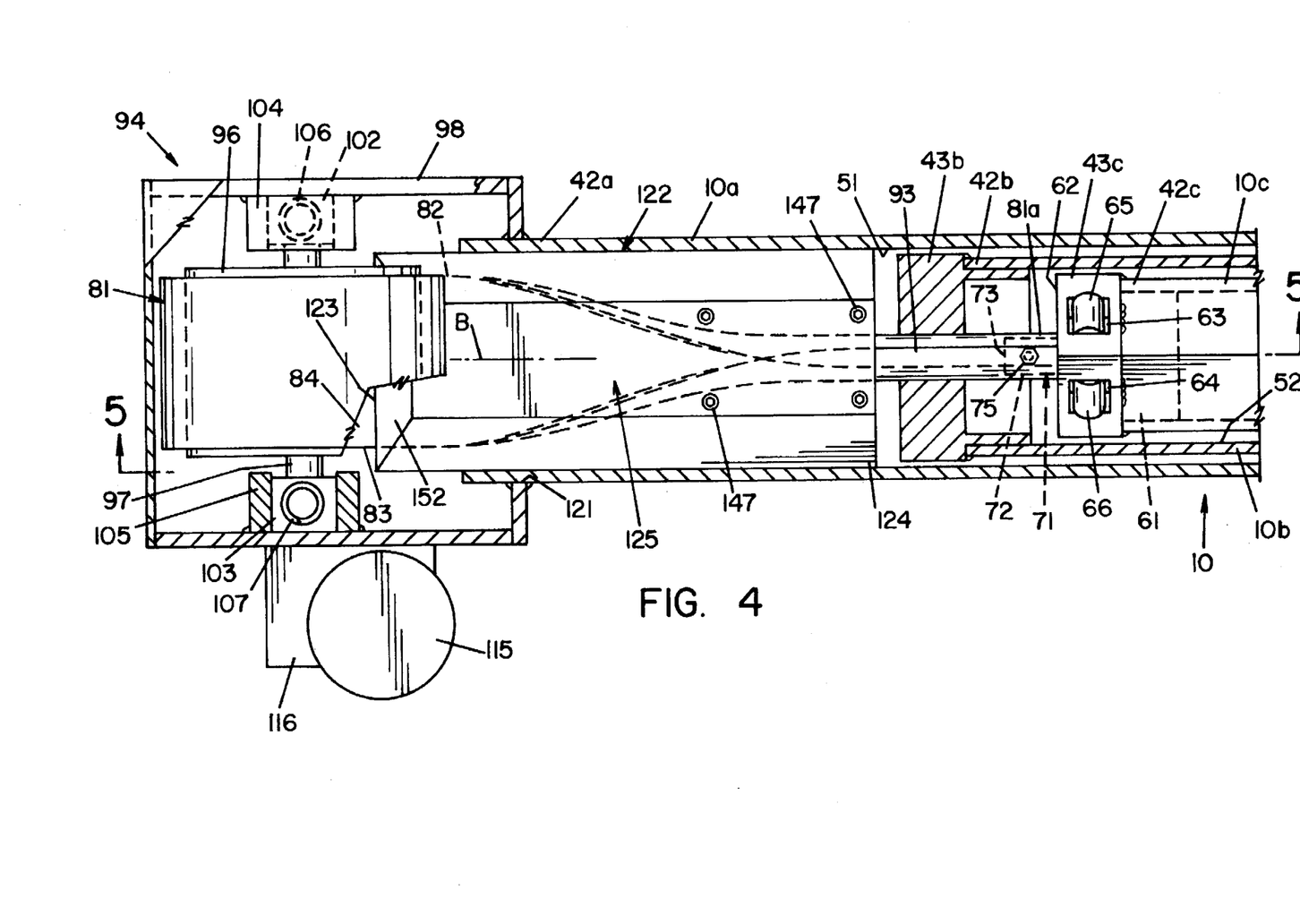
FIG. 4 is a plan view, partially in section, of a drive assembly according to the invention taken along line 4—4 of FIG. 3.
Figure 5:
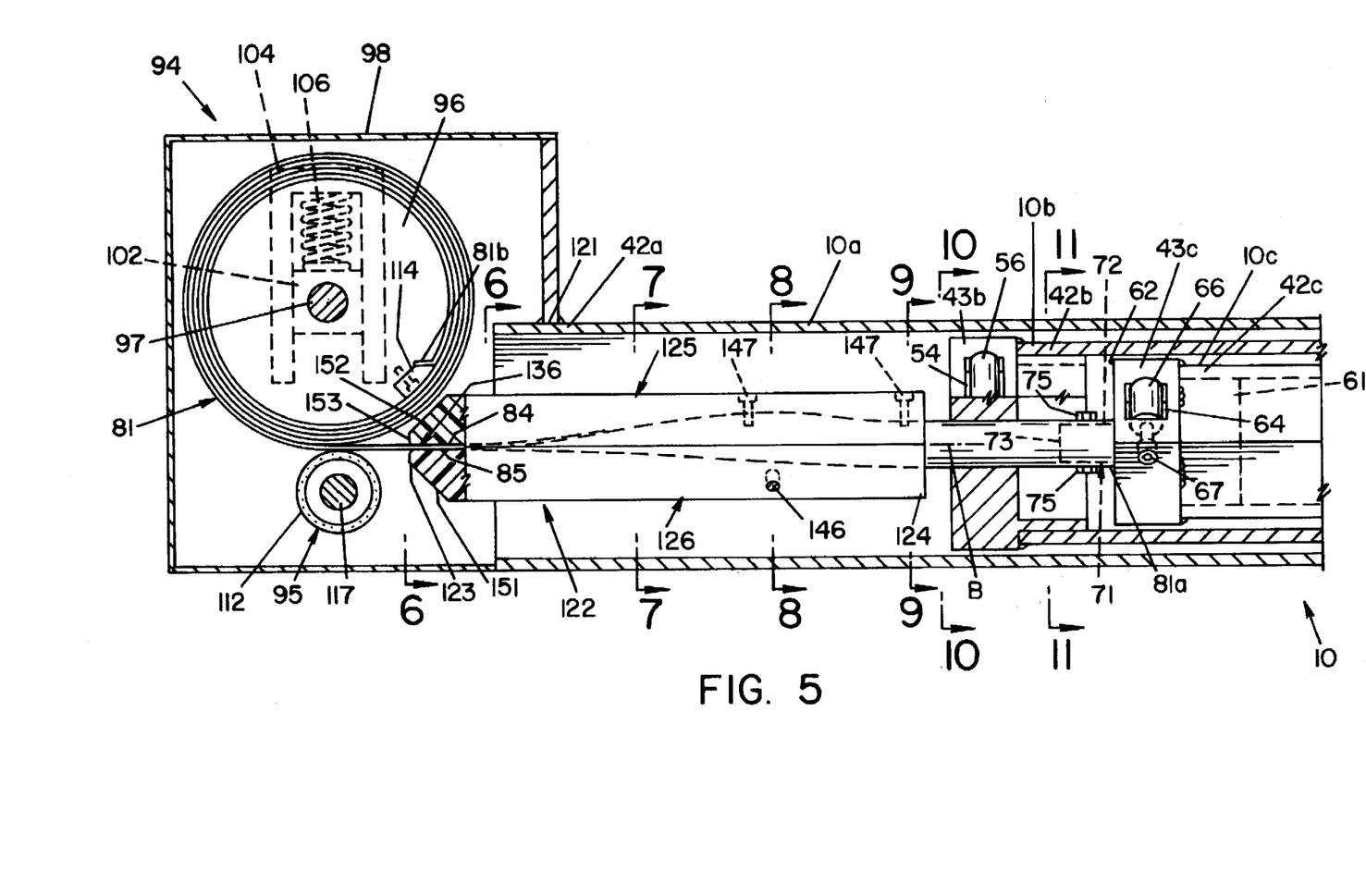
FIG. 5 is an elevation view, partially in section, of the drive assembly taken along line 5—5 in FIG. 4.

As is shown in FIGS. 4 and 5, a drive unit 94 includes a rubber covered drive wheel 95 and storage or take up drum 96, mounted on a storage drum shaft 97 in a drive unit enclosure 98. The opposite ends of storage drum shaft 97 are supported in floating bearing blocks 102 and 103. Floating bearing blocks 102 and 103 are vertically slidable in bearing block supports 104 and 105, respectively, and are biased downwardly therein by the springs 106 and 107. Springs 106 and 107 force floating bearing blocks 104 and 105 and thus drum 96 downward for drive member 81 on drum 96 to engage an outer rubber surface 112 of drive wheel 95. The inner end 81b of drive member 81 is fixed to take up drum 96 by a mounting block 114.

Drive unit 94 further includes a drive motor 115 and a gear box 116 mounted outside drive unit enclosure 98. Preferably, drive motor 115 is electric or air powered. Advantageously, in accordance with the invention, the ease with which the mast can be extended and retracted enables motor 115 to be a small motor, such as an automobile power window motor. Drive motor 115 is coupled to the drive wheel shaft 117 through gear box 116, and drive wheel shaft 117 is rotatably supported by bearing blocks (not shown) which are mounted within drive unit enclosure 98. Rotation of drive wheel 95 by drive motor 115 causes rubber surface 112 to displace drive member 81, thus to rotate take up drum 96.

In order to retract mast assembly 10 to a retracted position relative to drive unit 94, drive member 81 is drawn into drive unit enclosure 98 and about take up drum 96. More particularly in this respect, drive motor 115 is energized to rotate drive wheel 95 in a counterclockwise direction in FIG. 5, whereby drive member 81 moves from right to left and is pinched between take up drum 96 and drive wheel 95 by the bias springs 106 and 107 against floating bearing blocks 102 and 103. Counterclockwise rotation of drive wheel 95 causes clockwise rotation of take up drum 96 to wind drive member 81 onto drum 96. The frictional engagement between rubber surface 112 of drive wheel 95 and drive member 81 assures a positive drive with respect to drum 96. As drive member 81 is wound onto drum 96, floating bearing blocks 102 and 103 and springs 106 and 107 exert a constant force as the radial dimensions of the drum and drive member thereon progressively increase. This advantageously promotes use of a small drive motor. Take up drum 96 thus stores drive member 81 in a wound condition. Advantageously, very little space is required to store drive member 81 in this condition. When it is desired to extend mast 10, the direction of drive motor 115 is reversed causing drive wheel 95 to rotate in a clockwise direction in FIG. 5 and drum 96 to rotate counterclockwise, whereby drive member 81 is payed out from take up drum 96.

Figure 6:
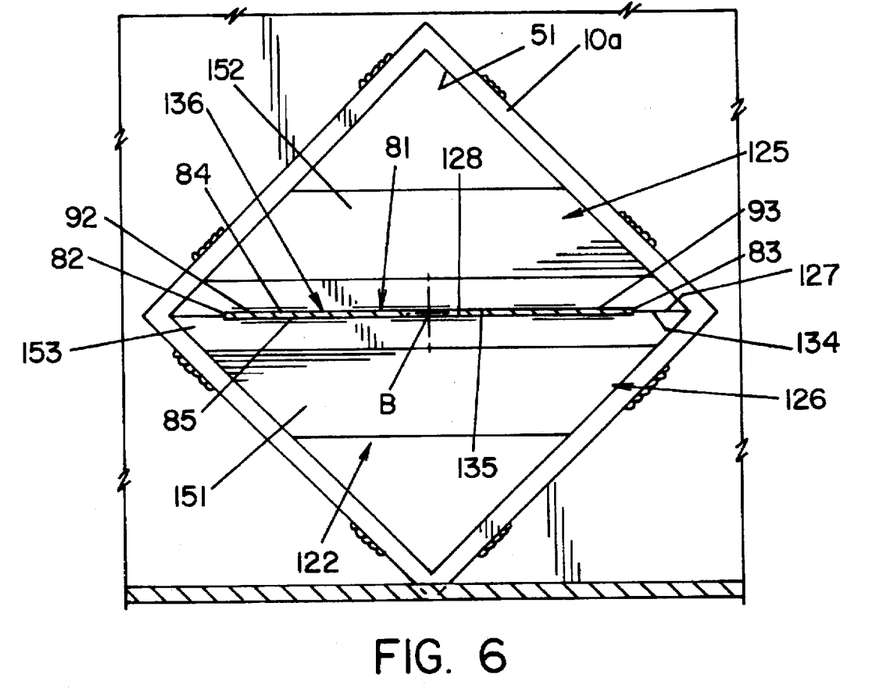
FIG. 6 is a sectional elevation view of the drive assembly taken along line 6—6 of FIG. 5.
Figure 7:
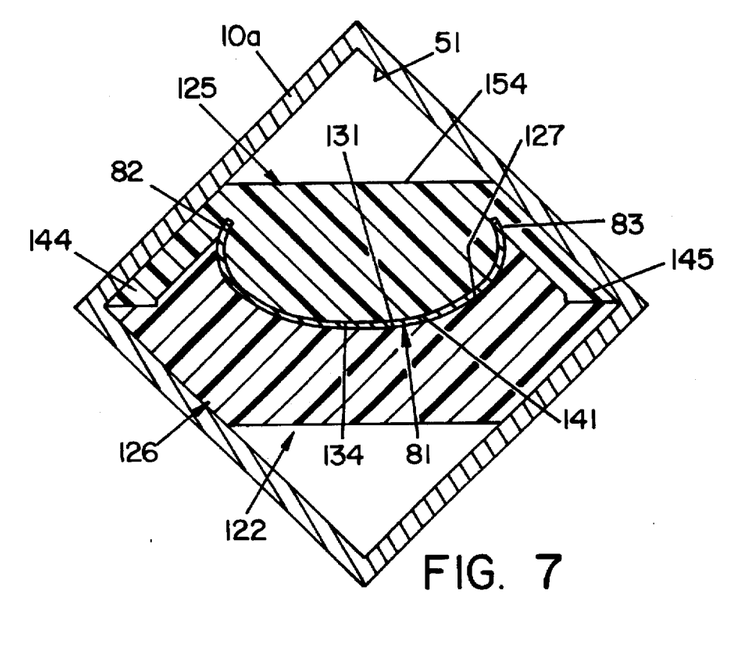
FIG. 7 is a cross-sectional view of the telescoping mast assembly taken along line 7—7 of FIG. 5.
Figure 8:
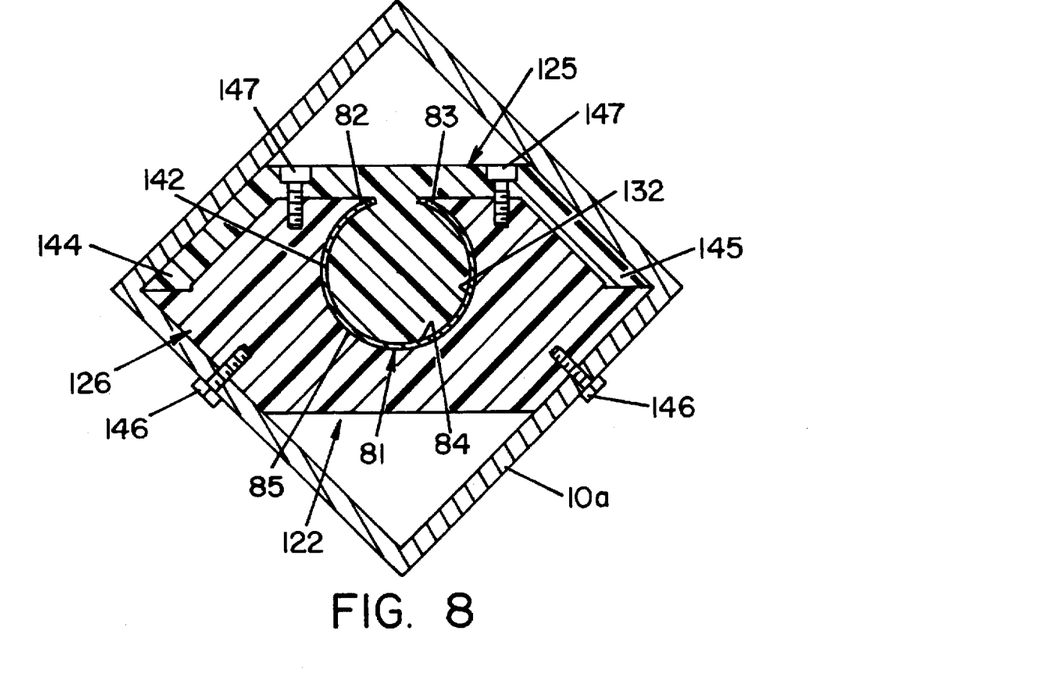
FIG. 8 is a cross-sectional view of the telescoping mast assembly taken along line 8—8 of FIG. 5.
Figure 9:
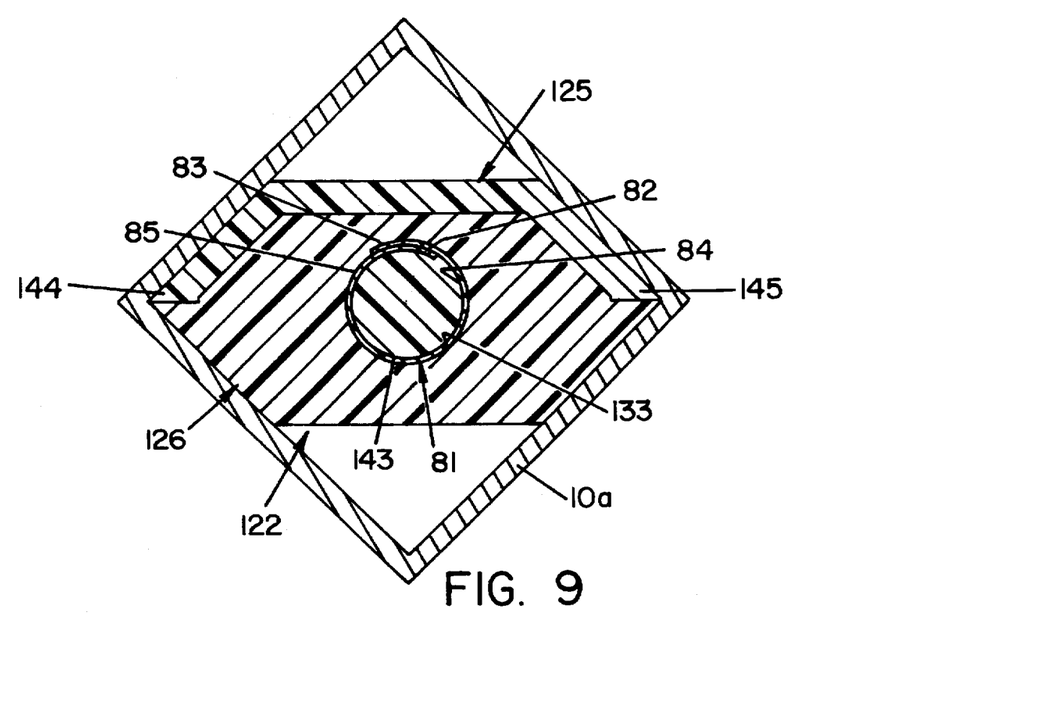
FIG. 9 is a cross-sectional view of the telescoping mast assembly taken along line 9—9 of FIG. 5.

As drive member 81 moves into end 42a of mast tube 10a which extends into an opening 121 within drive unit enclosure 98, it enters a longitudinally extending mold 122 having a first end 123 adjacent take up drum 96 and a second end 124 shown adjacent inboard end 42b of tube 10b in FIG. 5. Mold 122 takes drive member 81, i.e. the stainless steel foil ribbon, and gradually rolls the flat steel strip into a shape having a cross-sectional contour other than flat, as will be described herein. Mold 122 preferably includes an upper portion 125 and a lower portion 126 which are separable from one another. As can be seen from the cross-sectional views of mold 122 in FIGS. 6–9, lower portion 126 is molded at a complimentary upper surface 127 with a cross-sectional groove 128 having a flat cross-sectional shape. Groove 128 gradually changes into a concave surface 131, as shown in FIG. 7, a semi-circular surface 132 and a circular surface 133 as shown in FIGS. 8 and 9, respectively.

The upper portion 125 of mold 122 is placed in abutting relationship to lower portion 126 and has a correspondingly lower complimentary surface 134 along the longitudinal length of mold 122 between first end 123 and second end 124. Complimentary surface 134 includes a complimentary groove 135 opposite cross-sectional groove 128. Grooves 128 and 135 coact to form a foil slot 136 through which drive member 81 passes between take up drum 96 and mast assembly 10. In the preferred embodiment, foil slot 136 has a thickness slightly larger than 0.010 inches to accommodate the thickness of the stainless steel foil which forms drive member 81. As can be seen in FIG. 7, groove 135 gradually changes from having a flat cross-sectional shape, as shown in FIG. 6, to a convex surface portion 141, whereupon groove 135 further changes into a semi-circular surface 142 and a circular surface 143 as shown in FIGS. 8 and 9, respectively. Upper portion 125 of mold 122 includes the interlocking fingers 144 and 145. The coaction and resultant interlocking of concave surface 131 with convex surface 141 and semi-circular surface 132 with semi-circular surface 142 retains upper portion 125 in abutting relationship with lower portion 126. Interlocking fingers 144 and 145 of upper portion 125 also coacts with lower portion 126 and inside surface 51 of tube 10a to retain upper surface 127 and lower surface 134 in abutting relationship. To retain mold 122 in place within tube 10a, lower portion 126 is fastened to tube 10a by the bolts 146 adjacent second end 124. Also adjacent second end 124, upper portion 125 of mold 122 is fastened to lower portion 126 by the four hex head cap screws 147. Cap screws 147 prevent any sliding motion of one of upper portion 125 or lower portion 126 relative to the other.

It will thus be appreciated that as foil drive member 81 is pushed into foil slot 136 of mold 122 at first end 123, drive member 81 has a flat cross-sectional shape. As drive member 81 continues in the path along axis B through mold 122 it gradually assumes a semi-circular shape as shown is FIGS. 7 and 8. Thus prior to exiting foil slot 136 at second end 124, drive member 81 has assumed a circular cross-sectional shape whereby opposite longitudinal extending free edges 82 and 83 are in overlapping relationship. The overlapping relationship is such that the outer extending surface 85 is in abutting relationship with the inner extending surface 84, adjacent upper portion 125 of mold 122, as seen in FIGS. 9–11. The circular cross sectional shape allows drive member 81 to assure a positive drive of mast assembly 10 and is resistant to tensile, compressive and lateral loads.

First end 123 of mold 122 includes the two sloping trapezoidal surfaces 151 and 152 having an abutment surface 153 extending therebetween. Upper portion 125 and lower portion 126 together make up abutment surface 153. Foil slot 136 is located within abutment surface 133 at the intersection of upper portion 125 and lower portion 126. Sloping trapezoidal surfaces 151 and 152 allow mold 122 to extend from opening 121 to a position underneath take up drum 96 and toward the intersection of drum 96 and drive wheel 95. Thus, the unsupported length of drive member 81 between drum 96 and mold 122 is very short, where drive member 81 is in its flat cross sectional shape. This short length substantially reduces the possibility of buckling of foil member 81 prior to entering mold 122.

It will be appreciated that upper portion 125 and lower portion 126 are not fastened together, nor are they fastened to tube 10a in the region adjacent to first end 123. This allows foil drive member 81 to move slightly within foil slot 136 as it is being rolled into a loop shape to prevent any kinking or crimping of the stainless steel foil structure. However, it will also be appreciated that interlocking between portions 125 and 126 of mold 122 prevent any large movement between upper portion 125 and lower portion 126. By virtue of the interlocking, specifically, interlocking between complimentary upper surface 127 and complimentary lower surface 134, as shown in FIGS. 7–9, as well as provided by interlocking fingers 144 and 145 and the constraints thereon by inside surface 51 of tube 10a against a tube surface 154 of upper portion 125 prevents any abrupt or sudden movement or separation between upper portion 125 and lower portion 126.

As can be appreciated from the drawings, drive member 81 may be assembled to mast assembly 10 by first attaching outer end 81a to boss 71 and laying drive member 81 within cross sectional groove 128 of lower portion 126. Upper portion 125 then may be placed over lower portion 126 in a manner offset and to the left of lower portion 126, as viewed in FIG. 5, whereupon a sliding action to the right of upper portion 125 will insure complimentary surfaces 127 and 143 coact together with interlocking fingers 144 and 145 to prevent disassembly of upper portion 125 from lower portion 126. Hex head cap screws 147 will prevent any unintentional sliding motion in the reverse of the assembly sliding motion in order to keep each of upper portion 125 and lower portion 126 in place relative to each other.

As drive member 81 is payed out from drum 96 it enters mold 122 where the flat cross sectional contour of drive member 81 enters foil slot 136. Drive member 81 is then gradually changed so that a circular cross sectional contour exits from second end 124. The circular cross sectional contour provides the rigidity normally required to push tube 10c upward. Tube 10c will then, in turn pull tube 10b upward. Mast 10 can then be retracted in a like manner simply by reeling drive member 81 onto drum 96 whereupon drive member 81 pulls tube 10c downward, which in turn pulls tube 10b downward. The circular cross sectional shape of tube 10b at second end 124 is gradually changed to a flat cross sectional contour within foil slot 136 at first end 123 of mold 122. It will be appreciated that because drive member 81 is attached to boss 71 at one end and mounting block 114 of storage drum 96 at the other, a portion of drive member 81 is always within mold 122. Consequently, a portion of drive member is always circular in cross-section, while a separate portion is always flat in cross-section.

Thus, the present invention provides a single metal band drive member capable of assuming a rigid tubular condition for extension or retraction of a mast, and a space saving collapsed condition which is advantageous for storing the drive member flat on a reel. This space saving system provides significant advantages over prior art chains and multiple drive systems while retaining positive extension and retraction characteristics. It is also advantageous in that manufacture of the foil drive member does not involve additional expensive and complicated steps such as heat treating.

An alternative embodiment of that shown in FIGS. 4–11 is shown in FIGS. 12–16. While the mast assembly 10 and drive unit 94 remain generally the same as that previously described, mold 122 has been replaced with the four longitudinally spaced dies 161, 162, 163 and 164. Die 161 is shorter than dies 162, 163 and 164 and is placed beneath drum 96 in order to reduce the unsupported length of drive member 81 between die 161 and the intersection of drive wheel 95 and take up drum 96. As can be seen from FIG. 13, die 161 includes a foil slot 165 which has a thickness equal to or slightly greater than the 0.010 inch thickness of foil drive member 81. Die 161 is attached to the bottom of drive unit enclosure 98 by the bolts 166. Die 162 has a semi-elliptically shaped foil slot 165 within a die plate 171 for passage of drive member 81. Die plate 171 is attached to inside surface 51 of tube 10a by two screws 172 placed within the blocks 173 and 174 which are thus attached to die plate 171. In a like manner, die 163 has a semi-circular foil slot 165 within a die plate 175 and is attached to the inside surface 51 of tube 10a by screws 172 attached to the blocks 176 and 177. Finally, die 164 includes a circular hole opening 181 within the die plate 182. Circular hole opening 181 allows that die 164 can accommodate the preferred overlapping feature of free edges 82 and 83 as described above with respect to FIGS. 4–11. As with dies 161, 162 and 163, die plate 182 is attached to inside surface 51 of tube 10a by screws 172 attached to the blocks 183 and 184.

Figure 12:
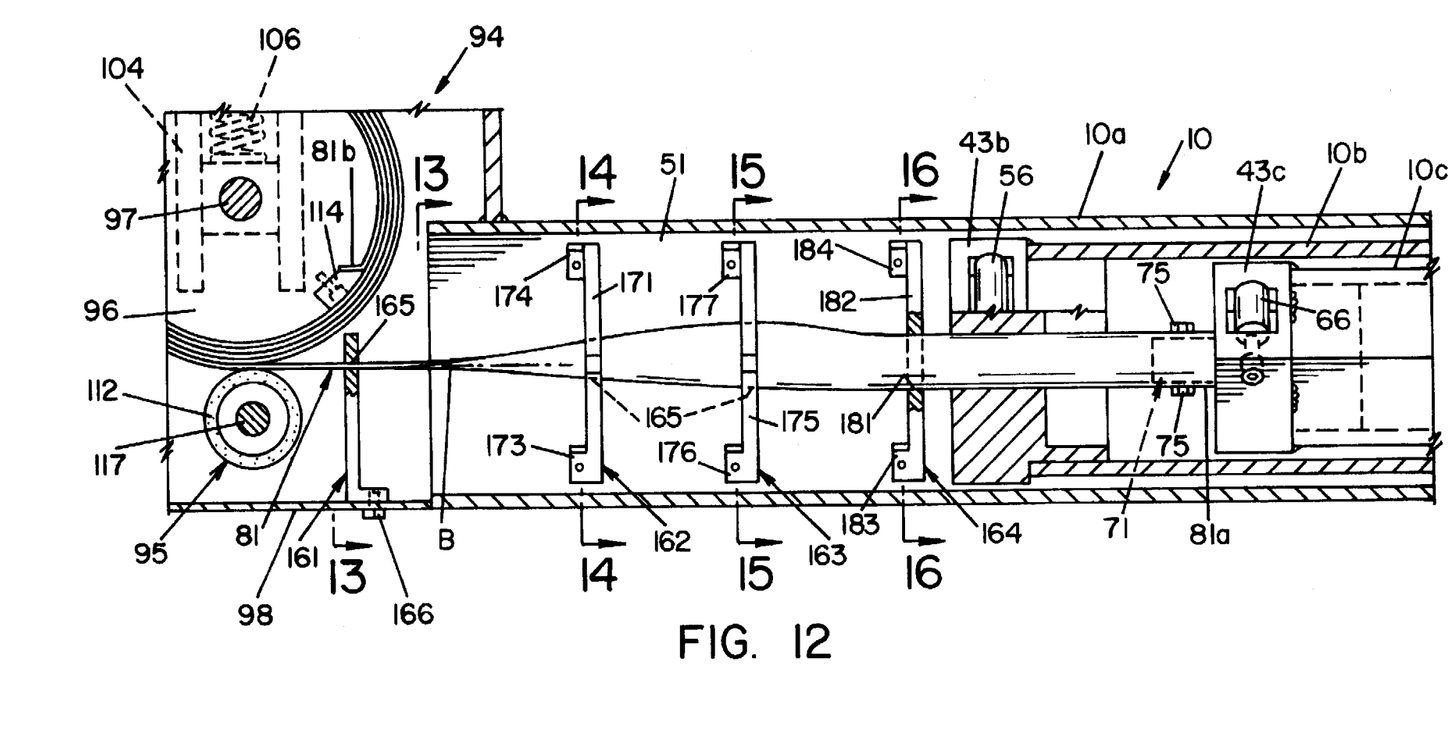
FIG. 12 is an elevation view, partially in section, of another embodiment of a drive assembly according to the invention.
Figure 13:
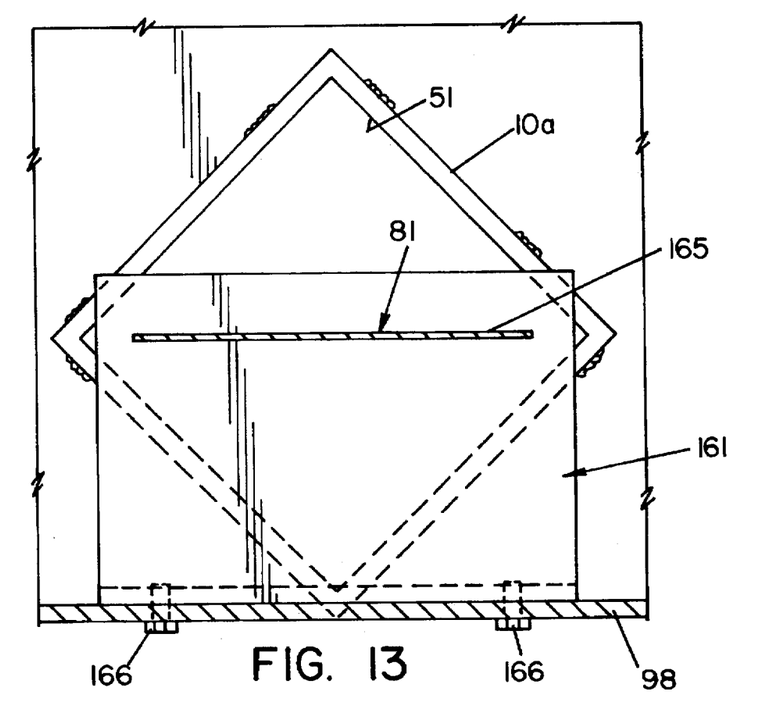
FIG. 13 is a cross-sectional view of the telescoping mast assembly taken along line 13—13 of FIG. 12.
Figure 14:
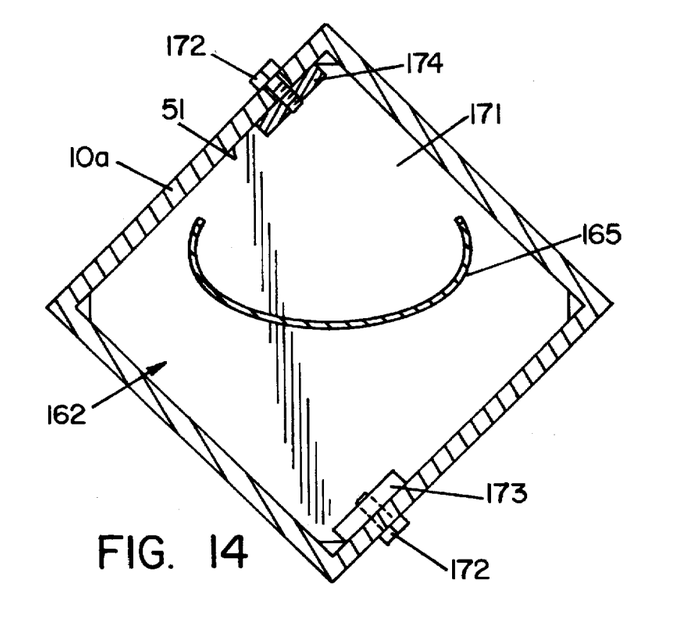
FIG. 14 is a cross-sectional view of the telescoping mast assembly taken along line 14—14 of FIG. 12.
Figure 15:
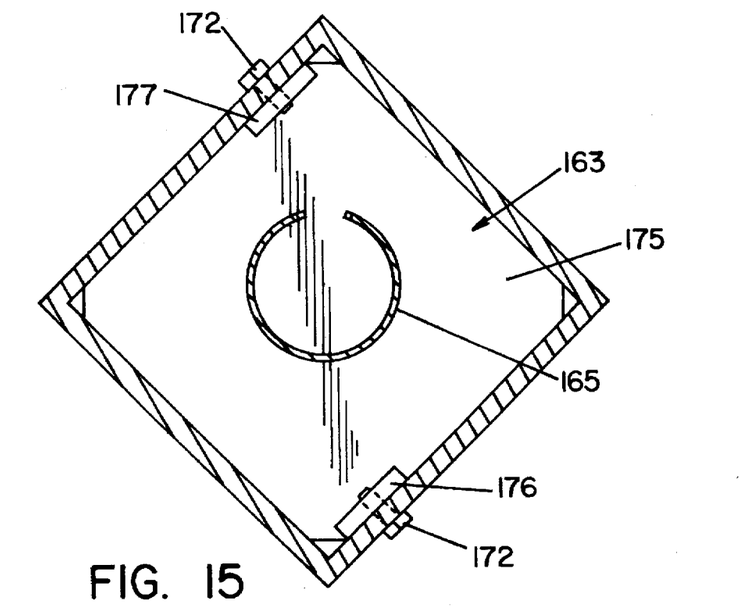
FIG. 15 is a cross-sectional view of the telescoping mast assembly taken along line 15—15 of FIG. 12.
Figure 16:
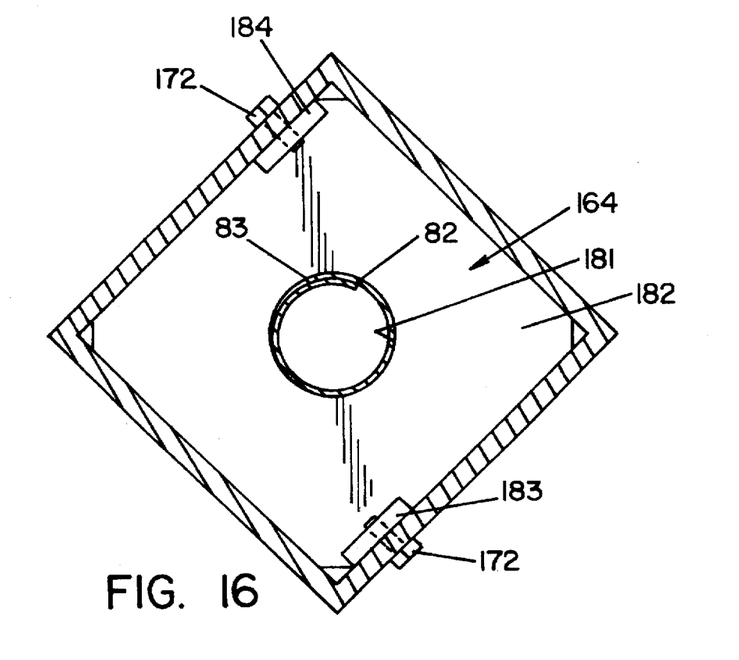
FIG. 16 is a cross-sectional view taken along line 16—16 of FIG. 12.

As best seen in FIG. 12, die plates 161 through 164 are sequentially spaced along axis B. Thus, die plates 161–164 gradually form foil and drive member 81 from a flat cross sectional shape as it leaves drum 96 into a circular cross sectional shape as it leaves opening 181. The relatively close spacing between adjacent dies, i.e. between die 161 and 162, between die 162 and 163 and between die 163 and 164 ensure that foil drive member 81 does not bend, buckle, crimp or kink between adjacent dies.

Figure 17:
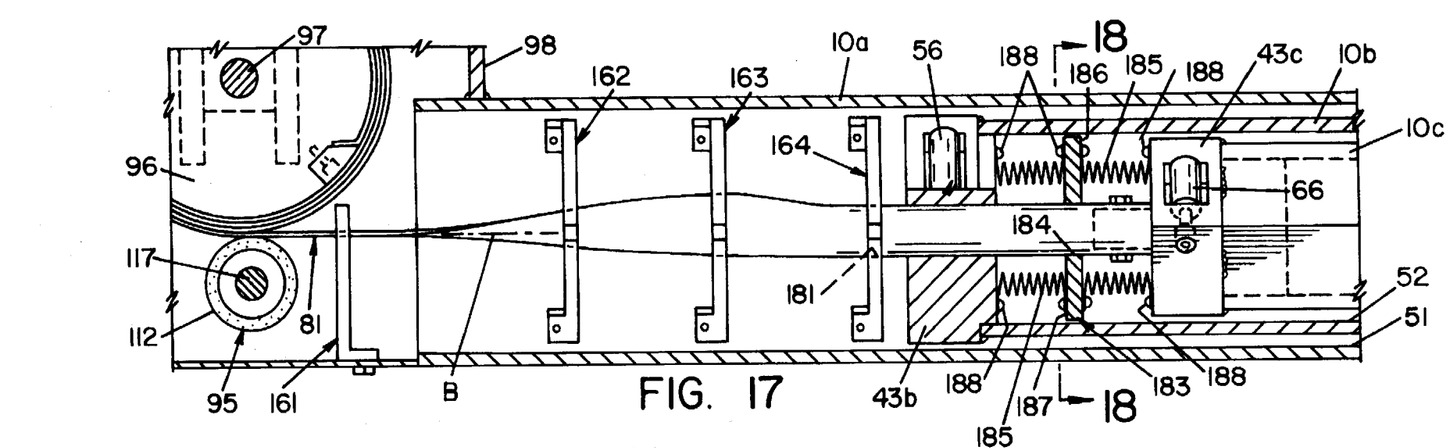
FIG. 17 is an elevation view, partially in section, of another embodiment of the drive assembly of the present invention.
Figure 18:
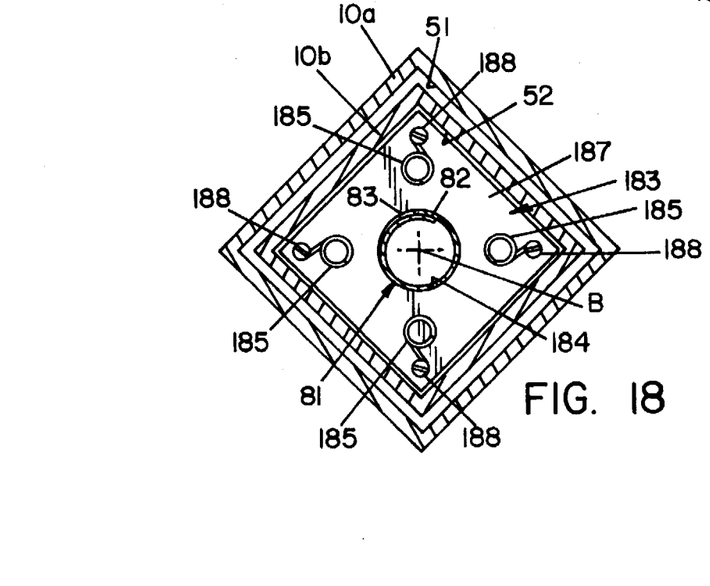
FIG. 18 is a cross-sectional view taken along line 18—18 of FIG. 17.

Another embodiment of that shown in FIGS. 12–16 is shown in FIGS. 17 and 18. Therein, a support plate 183 is placed within the interior of tube 10b. This support plate 183 has an opening 184 which is coaxial with axis B and is relatively of the same diameter as opening 181. Support plate 183 is suspended adjacent inside surface 52 of tube 10b by the eight identical springs 185. Four of springs 185 extend between an outer plate surface 186 and inboard collar 43c while four of springs 185 extend between an inner plate surface 187 and inboard collar 43b. It will be appreciated that each of springs 185 is attached to either of inboard collars 43b or 43c and support plate 183 by the screws 188. As tube 10c is extended and retracted, springs 185 ensure that support plate 183 remains relatively equidistant between inboard collar 43b and inboard collar 43c. As such, the unsupported length of drive member 81 between inboard collar 43b and inboard collar 43c is reduced by half the distance it would be without support plate 183. This substantially adds to the rigidity of the overall telescoping mast assembly and specifically to the rigidity of drive member 81.

Each of mold 122 or dies 161–164 and support plate 183 are preferably manufactured from friction resistant nylon block material. However, any material having a low coefficient of friction as against stainless steel strip drive member 81 may be used.

While considerable emphasis has been placed herein on the specific embodiments of the invention, it will be appreciated that other embodiments as well as modifications of the embodiments disclosed will be suggested or apparent and can be made without departing from the principles of the invention. For example, in so far as the drive member is concerned, the molds may be used to form a semi-circular drive member instead of the preferred circular drive member. Such a drive member could also have a greater thickness since the elastic bending imparted to the strip is less than the preferred embodiment. Additionally, the mast sections are not limited to being polygonal shape and may be of any shape. Accordingly, it is to be distinctly understood that the foregoing descriptive matters should be interpreted merely as an illustration of the present invention, not as a limitation of same.

Having thus described the invention, it is claimed:

1. A telescoping mast assembly comprising a plurality of interconnected mast sections nested within each other for movement along a path between retracted and extended positions, and drive means including single ribbon drive member means connected to one of said sections for displacing said sections in opposite directions along said path between said extended and retracted positions, said ribbon drive member means having an axis generally parallel to said path and two longitudinal extending free edges generally parallel to said axis, said single ribbon drive member means having a loop cross-sectional shape transverse to said axis in said extended position, said free edges being unattached and ribbon contour forming means for shaping said ribbon means along said path.

2. The telescoping mast assembly of claim 1, wherein said single ribbon drive member means is generally flat in cross-section to said axis in said retracted position and is generally circular in cross-section transverse to said axis in said extended position and one of said free edges overlapping the other of said free edges.

3. The telescoping mast assembly of claim 1, including reel means for storing said ribbon, said ribbon contour forming means being located between said interconnected mast sections and said reel means.

4. The telescoping mast assembly of claim 1, including reel means for storing said ribbon drive member means, and means to rotate said drive member means between extended and retracted positions.

5. The telescoping mast assembly of claim 1, wherein said mast sections are telescoping tubular sections and said ribbon drive member means is located within said tubular sections.

6. The telescoping mast assembly of claim 5, wherein said tubular sections include bearing means therebetween for facilitating said movement along said path.

7. The telescoping mast assembly of claim 5, wherein one of said mast sections is an innermost mast section connected to said ribbon drive member means.

8. The telescoping mast assembly of claim 1, wherein said ribbon drive member means is comprised of a single steel strip having said loop cross-sectional shape within said mast sections.

9. The telescoping mast assembly of claim 8, including reel means for storing and said ribbon drive member means and said ribbon means is comprised of a single steel strip having a planar cross-sectional shape on said reel means.

10. The telescoping mast assembly of claim 1, wherein said ribbon contour forming means is a longitudinally extending mold between a first end and a second end, said first end adjacent said reel means and said second end adjacent said mast sections.

11. A telescoping mast assembly comprising a plurality of interconnected mast sections nested within each other for movement along a path between retracted and extended positions, and drive means including single ribbon drive member means connected to one of said sections for displacing said sections in opposite directions along said path between said extended and retracted positions and ribbon contour forming means for shaping said ribbon means along said path, said ribbon contour forming means being a longitudinally extending mold between a first end and a second end, said first end adjacent said reel means and said second end adjacent said mast sections, said mold has slot means extending between said first and second ends for shaping said single steel strip.

12. The telescoping mast assembly of claim 11, wherein said slot means includes a slotted opening having a planar cross-sectional shape at said first end, a circular cross-sectional shape at said second end and a transitional shape therebetween.

13. A telescoping mast assembly comprising a plurality of interconnected mast sections nested within each other for movement along a path between retracted and extended positions, and drive means including single ribbon drive member means connected to one of said sections for displacing said sections in opposite directions along said path between said extended and retracted positions and ribbon contour forming means for shaping said ribbon means along said path, said single ribbon drive member means has an axis and said ribbon contour forming means includes a plurality of axially spaced dies each having a first end and a second end.

14. The telescoping mast assembly of claim 13, wherein each of said plurality of dies has a single cross-sectional shape between said first end and said second end.

15. The telescoping mast assembly of claim 13, including reel means for storing said ribbon drive member means.

16. The telescoping mast assembly of claim 15, wherein said plurality of axially spaced dies are between said reel means and said mast sections.

17. The telescoping mast of claim 16, wherein said ribbon means is comprised of a single steel strip having a planar cross-sectional shape on said reel means.

18. A telescoping mast assembly comprising a plurality of interconnected mast sections nested within each other for movement along an axis between retracted and extended positions, a single drive member having a loop shape within said mast sections and connected to one of said sections for displacing said sections in opposite directions along said axis between said extended and retracted positions, said single drive member having two longitudinally extending free edges generally parallel to said axis, said free edges being unattached.

19. The telescoping mast assembly of claim 18, including means for retaining said loop shape located within said mast sections.

20. The telescoping mast assembly of claim 19, wherein said means for retaining includes at least one plate located transverse to said axis.

21. The telescoping mast assembly of claim 18, wherein said loop shape is a circular cross-sectional shape drive member.

22. The telescoping mast assembly of claim 18, including reel means for storing said drive member, said drive member having a planar cross sectional shape on said reel means.

23. The telescoping mast assembly of claim 22, including ribbon contour forming means for shaping said ribbon means between said reel means and said mast sections.

24. The telescoping mast assembly of claim 23, wherein said ribbon contour forming means is a longitudinally extending mold between a first end and a second end, said first end adjacent said reel means and said second end adjacent said mast sections.

25. A telescoping mast assembly comprising a plurality of interconnected mast sections nested within each other for movement along an axis between retracted and extended positions, a single drive member having a loop shape within said mast sections and connected to one of said sections for displacing said sections in opposite directions along said axis between said extended and retracted positions, reel means for storing said drive member, said drive member having a planar cross sectional shape on said reel means, ribbon contour forming means for shaping said ribbon means between said reel means and said mast sections, said ribbon contour forming means being a longitudinally extending mold between a first end and a second end, said first end adjacent said reel means and said second end adjacent said mast sections, said mold having slot means extending between said first and second ends for shaping said single steel strip.

26. The telescoping mast assembly of claim 25, wherein said slot means includes a slotted opening having a planar cross-sectional shape at said first end, a circular cross-sectional shape at said second end and a transitional shape therebetween.

27. The telescoping mast assembly of claim 18, wherein one of said free edges is overlapping the other of said free edges.

28. A telescoping mast assembly comprising a plurality of interconnected mast sections nested within each other for movement along an axis between retracted and extended positions, a single drive member having a loop shape within said mast sections and connected to one of said sections for displacing said sections in opposite directions along said axis between said extended and retracted positions, said single drive member having an axis and including ribbon contour forming means for shaping said ribbon, said ribbon contour forming means including a plurality of axially spaced dies each having a first end and a second end.

29. The telescoping mast assembly of claim 28, wherein each of said plurality of dies has a single cross-sectional shape between said first end and said second end.

30. The telescoping mast assembly of claim 28, including reel means for storing said ribbon drive member means.

31. The telescoping mast assembly of claim 30, wherein said plurality of axially spaced dies are between said reel means and said mast sections.

32. The telescoping mast of claim 31, wherein said ribbon means is comprised of a single steel strip having a planar cross-sectional shape on said reel means.

33. The telescoping mast assembly of claim 18, including ribbon contour forming means for shaping said ribbon means along said axis.

34. The telescoping mast assembly of claim 33, including reel means for storing said ribbon, said ribbon contour forming means being located between said interconnected mast sections and said reel means.

35. The telescoping mast assembly of claim 18, including reel means for storing said single drive member, and means to rotate said single drive member between extended and retracted positions.

36. The telescoping mast assembly of claim 18, wherein said mast sections are telescoping tubular sections and said single drive member is located within said tubular sections.

37. The telescoping mast assembly of claim 36, wherein said tubular sections include bearing means therebetween for facilitating said movement along said axis.

38. The telescoping mast assembly of claim 36, wherein one of said mast sections is an innermost mast section connected to said single drive member.

39. The telescoping mast assembly of claim 18, wherein said single drive member is comprised of a single steel strip.

40. A telescoping mast assembly comprising a plurality of interconnected mast sections nested within each other for movement along an axis between retracted and extended positions, single drive member means for displacing said sections in opposite directions along said axis between extended and retracted positions, said single drive member means including longitudinally extending free edges and rolled against an inherent bias to form a loop cross-sectional shape within said mast sections, said free edges being unattached.

* * * * *